US006980830B2

(12) United States Patent
Ahonen

(10) Patent No.: US 6,980,830 B2
(45) Date of Patent: Dec. 27, 2005

(54) METHOD FOR ARRANGING SIM FACILITY TO DIGITAL WIRELESS TERMINAL EQUIPMENT AND CORRESPONDING TERMINAL EQUIPMENT AND SERVER

(75) Inventor: Petri Ahonen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 232 days.

(21) Appl. No.: 10/618,396

(22) Filed: Jul. 10, 2003

(65) Prior Publication Data

US 2004/0023689 A1 Feb. 5, 2004

(30) Foreign Application Priority Data

Aug. 2, 2002 (FI) .................................. 20025036

(51) Int. Cl.[7] ............................................... H04B 1/38
(52) U.S. Cl. .................. 455/558; 455/557; 455/550.1; 455/418; 455/420; 455/419
(58) Field of Search ............................ 455/558, 557, 455/550.1, 418, 407, 420, 419

(56) References Cited

U.S. PATENT DOCUMENTS

| 6,097,967 A | | 8/2000 | Hubbe et al. |
| 6,104,928 A | * | 8/2000 | Waugh ........................ 455/445 |
| 6,282,412 B1 | * | 8/2001 | Lyons ...................... 455/186.1 |
| 6,324,402 B1 | * | 11/2001 | Waugh et al. ............... 455/445 |
| 6,671,522 B1 | * | 12/2003 | Beaudou ...................... 455/558 |
| 2003/0145205 A1 | * | 7/2003 | Sarcanin ...................... 713/172 |
| 2004/0042604 A1 | * | 3/2004 | Hiltunen et al. ........ 379/211.05 |
| 2004/0180657 A1 | * | 9/2004 | Yaqub et al. ............. 455/435.1 |
| 2005/0064862 A1 | * | 3/2005 | Castrogiovanni et al. ... 455/420 |

FOREIGN PATENT DOCUMENTS

| EP | 0562890 B1 | 6/2000 |
| FI | 104681 B | 3/2000 |
| FI | 108390 B | 1/2002 |
| WO | WO-00/40048 A1 | 7/2000 |
| WO | WO-01/76309 A1 | 10/2001 |

* cited by examiner

Primary Examiner—Lester G. Kincaid
Assistant Examiner—Khai Nguyen
(74) Attorney, Agent, or Firm—Harrington & Smith, LLP

(57) ABSTRACT

The invention concerns a method for arranging SIM (Subscriber Identity Module) facility to digital wireless terminal equipment communicating in a data communication network, wherein the said SIM facility is associated with a processor functionality and memory devices for storing application, subscriber and network specific data and wherein the terminal equipment is also associated with a processor functionality for carrying out of dynamic applications. In the method at least a main part of the application, subscriber and network specific data implementing the SIM facility is downloaded into the terminal equipment through the data communication network.

16 Claims, 3 Drawing Sheets

METHOD FOR ARRANGING SIM FACILITY TO DIGITAL WIRELESS TERMINAL EQUIPMENT AND CORRESPONDING TERMINAL EQUIPMENT AND SERVER

FIELD OF THE INVENTION

The invention concerns a method for arranging SIM (Subscriber Identity Module) facility to digital wireless terminal equipment communicating in a data communication network, herein the said SIM facility is associated with a processor functionality and with memory devices for storing application, subscriber and network specific data and wherein the terminal equipment is also associated with a processor functionality for carrying out dynamic applications. The invention also concerns a corresponding piece of terminal equipment and a server.

BACKGROUND OF THE INVENTION

Nowadays mobile equipment systems generally use special smart card applications. These are used to divide the MS (Mobile Station) into a so-called general ME (Mobile Equipment) part functioning in a mobile equipment system of a defined type and into a separate network/subscriber-specific part, which is also known more generally as a so-called SIM (Subscriber Identity Module) facility.

A subscriber connection is usually needed these days for communicating with terminal equipment in an established data communication network. The connection is used to identify, among other things, one or more data transmission networks, wherein communication is permissible, and detailed settings related to the subscriber connection, such as, for example, network/operator-specific data (encryption algorithms, among other things) and subscriber-specific data, such as, for example, the IMSI (International Mobile Subscriber Identity).

According to the known technology, data is stored on a small physically implemented silicon chip connected with the terminal equipment. At least storing means are arranged on the chip for storing the above-mentioned data and for using it in the terminal equipment as well as a possible micro controller functioning as the processor unit. In some environments the processor functionality may also be arranged in the terminal equipment module proper. However, as a general rule, the SIM facility is usually arranged on a plastic base as a compact and physical entity, which may also be called a SIM card.

For SIM cards of the known kind there is a standard connection in the mobile terminal equipment including connecting pins for connecting it electrically to the terminal equipment. The overall structure of the SIM card includes, besides the possible micro controller arranged on it, also various storing means and auxiliary circuits relating for example to the management of its internal data transmission and operating voltage.

The micro controller possibly placed on the SIM card is used to carry out the SIM application, which has several different manufacturers, as is known. In the state of the art, network operators or other such providers of subscriber connection services give these manufacturers their own instructions and settings, and the SIM applications will be in accordance with these in the end. The application includes, among other things, the micro controller's instruction set and file references for reading, interpreting and updating the network, terminal equipment and subscriber data arranged in the storing devices, as well as execution of authentication and encryption algorithms.

Solutions have been sought for quite a long time in the mobile station branch to replace the fixed SIM facility, for example, in M2M equipment. Almost without exception, state-of-the-art SIM smart cards cause problems and strains for all parties acting with the terminal equipment. Firstly, the distribution logistics required by the supplying of SIM cards and generally their arrangement in terminal equipment is problematic to terminal equipment manufacturers and device dealers.

Another drawback for terminal equipment manufacturers are the significant cost items caused by SIM cards as well as design and structural limitations and size limitations in general, which they establish for terminal equipment and equipment modules. Even the arranging of standard connections required by the state-of-the-art SIM card in the terminal equipment constitutes a significant cost item in serial production of terminal equipment.

Another drawback especially affecting the subscriber using the terminal equipment is the risk of destruction of data stored in SIM cards of the known kind, for example, in situations where the supply of power to the terminal equipment is interrupted for some reason in the middle of the communication carried on with it.

Known technology relating to the SIM facility is described in the FI-104139B (Nokia Networks Oy), FI-104937 (Sonera Oyj), WO-98/53629 (Motorola, Inc), EP-1037159A2 (Nokia Mobile Phones LTD.) publications. Of these, the FI-104937 publication (Sonera Oyj) presents a method for carrying out a smart card facility, which allows implementation of comprehensive services with the data communication device. However, this provides no solution to the drawbacks mentioned above.

Besides these, the state of the art also knows solutions for reconfiguration of the SIM facility through the data transmission network. Examples of such are presented, for example, in the EP-0 562 890 B1, U.S. Pat. No. 6,097,967, WO 00/40048 and FI-108390 publications. Such reconfigurations may include, for example, activation of mobile station services or downloading of so-called value-added services in the terminal equipment. However, to carry out these measures the terminal equipment must be in such a state that the actual SIM facility is already arranged in the terminal equipment, and in connection with it additional data is just downloaded from the data transmission network.

Such measures, for example, are also known, which are taken in connection with a change of the subscriber connection in order to transfer subscriber-specific data, such as, for example, SMS (Short Data Message) messages and telephone memo data from the old SIM card to the new card. This step may be performed either at the terminal equipment or, for example, at the network operator's service outlet with a special configuration application.

SUMMARY OF THE INVENTION

It is a purpose of this invention to bring about a method of a new kind for arranging SIM facility to digital wireless terminal equipment and corresponding terminal equipment and server. The characteristic features of the method according to the invention are presented in claim 1, those of the terminal equipment are presented in claim 16 and those of the server in claim 17.

According to a first embodiment, a physical SIM card may be arranged in the terminal equipment, and a mere processor functionality is arranged for the card. However, the SIM card may be arranged in such a way that when the terminal equipment is activated for use by the subscriber and during this use the SIM card requires no processing of the present kind.

According to another embodiment, there is no physical SIM card at all in the terminal equipment. Hereby there is not either any need for SIM interfaces of the known kind in connection with the terminal equipment. Numerous advantages are achieved in this way from the viewpoint of several parties. The size of the terminal equipment itself and the size of the circuit module belonging in connection with it are reduced significantly, which results in, for example, a reduction in the costs of manufacturing the terminal equipment.

Furthermore, the absence of the SIM card also results in a significant saving of costs, for example, for the network operator, because he need no longer provide SIM cards. From the viewpoint of the equipment distributor and the final user of the terminal equipment the terminal equipment according to the invention is considerably more user-friendly due to the total elimination of the need to install a physical SIM card of the known kind. All parties also achieve an advantage in that the problems resulting from destruction of SIM data will disappear thanks to the method according to the invention.

Some in no way limiting examples of wireless terminal equipment where the invention may be applied are solutions based on the CDMA (Code Division Multiple Access), TDMA (Time Division Multiple Access) and FDMA (Frequency Division Multiple Access) technologies and their subordinated definitions, including systems of the third generation. In addition, the invention may also be applied, for example, in multimedia terminal equipment, of which digital TV and satellite receivers can be mentioned as examples. The term "SIM" can also be understood very broadly. It may also be understood as, for example, an authentication module (DAM) known from the DECT standard. Nor are those standards excluded from the scope of the method according to the invention, which stand for the same cause.

Other characteristic features of the method, terminal equipment and server according to the invention will emerge from the appended claims, and more advantages that can be achieved are listed in the description part.

BRIEF DESCRIPTION OF THE DRAWINGS

The method, terminal equipment and server according to the invention, which are not limited to the embodiments to be presented hereinafter, are described in greater detail by referring to the appended figures, in which.

DETAILED DESCRIPTION OF THE INVENTION

Figure 1:
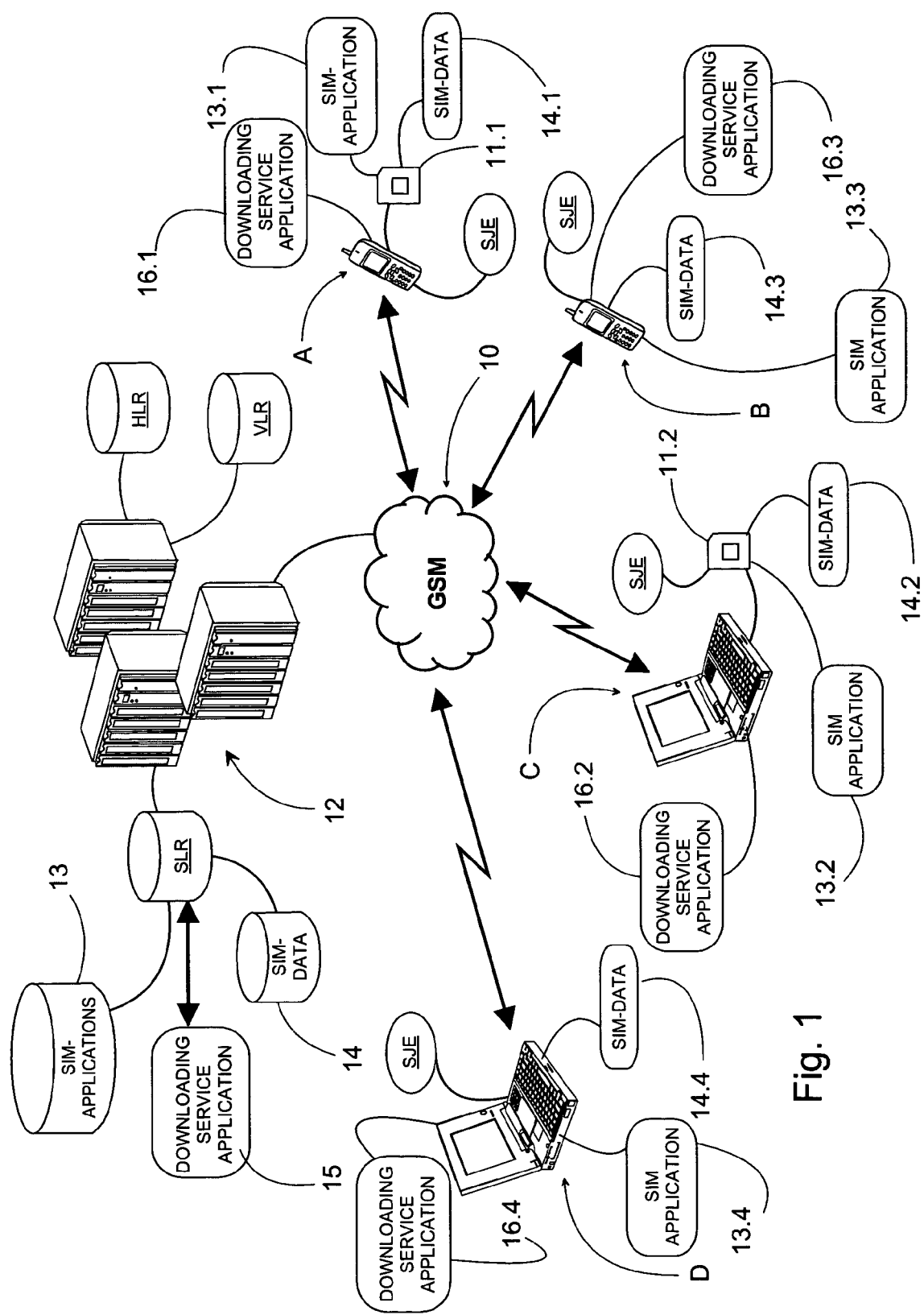
FIG. 1 is a schematic view showing an example of an application environment of the method according to the invention.

FIG. 1 is a schematic view showing an example of an application environment for the method according to the invention. Here pieces of digital terminal equipment, which are, for example, mobile terminal equipment, such as GSM telephones A, B or data terminal equipment, such as, for example, personal computers PC C, D, are in wireless communication in a data communication network 10, which in the case according to the example is in accordance with the GSM standard.

According to a first embodiment, the terminal equipment A, C may be associated with a physical essentially non-initialised SIM card 11.1, 11.2. Hereby, for example, an internal modem or such (not shown) is used for the data transmission to be carried on from PC C. Such a SIM card 11.1, 11.2 is characterised in that in the non-initialised state no SIM data 13.1, 14.1, 13.2, 14.2 allowing communication in data communication network 10 is arranged for it (possibly with the exception of an emergency number). The SIM data includes, although with no limitation of its contents, at least a main art of the network operators' or other such service providers' SIM applications 13.1, 13.2 and any such special services provided by them, which benefit, for example, the SAT (SIM Application Toolkit) facility know as such. Further, the SIM data may include subscriber and network specific data 14.1, 14.2, such as, for example, PIN(½) and PUK(½) codes, a secred K key, a mobile station subscriber identifier (IMSI) and algorithms, such as, for example, algorithms (A3, A8) to do with authentication of the network. The SIM data can also be said to include, for example, network visit information relating to data communication network 10, processing of the physical interface of the SIM—terminal equipment and security data belonging to the SIM facility, such as the SIM serial number.

However, for the non-initialised SIM card 11.1, 11.2 is arranged, for example, a virtual processor functionality and a downloading service application to be run in connection with it, which is used for carrying out, among other things, protected downloading of SIM data between the terminal equipment A, C and the SIM interface. As a possible although not limiting example of the said functionality the JAVA virtual processor SJE (Security Java Engine) may be mentioned.

The processor functionality SJE is arranged to work in a protected environment to make sure that SIM data 13.1, 14.1, 13.2, 14.2 is not given to unauthorised parties. Ensuring reliable data security is in fact a significant feature in all respects in the method according to the invention. There are protected storing devices for the subscriber data 14.1, 14.2, for the encryption key and, for example, for the network's program authentication and encryption algorithms 13.1, 13.2 to be arranged in terminal equipment A, C. Encryption may be carried out, for example, in such a way that the terminal equipment A, C includes a chip containing the encryption functionality or, alternatively, by using some encryption model of the memory.

According to another embodiment, there may be no physical SIM card at all in the terminal equipment B, D. Hereby the personal computer PC D may be connected to a PCMCIA card telephone, that is, a GSM modem or WLAN (Wireless Local Area Network) card (not shown).

Hereby a virtual processor functionality is arranged in connection with the terminal equipment B, D, of which a virtual protected JAVA processor functionality SJE can be mentioned as a non-limiting example. The JAVA processor SJE may as such be of a kind similar to that used in the present-day most advanced terminal equipment.

In the method according to the invention at least a main part of the application, subscriber and network specific data implementing the SIM facility, of which examples (however, not limiting in any way the contents of the data to be downloaded) were mentioned already in the case of the first embodiment, is downloaded in the terminal equipment A–D through data communication network 10. Hereinafter the common name of SIM data is used for this data. As there is no physical SIM card, the SIM data to be downloaded need not necessarily include any data required for processing of the physical interface of SIM terminal equipment.

For this purpose there is arranged in connection with terminal equipment A–D, besides the processor functionality SJE, a special SIM downloading application 16.1–16.4 for downloading the SIM data through data communication network 10 or such into terminal equipment A–D and, for example, in order to transfer it from a first piece of terminal equipment A to a second piece of terminal equipment B. The downloading application 16.1–16.4 includes a module, which routes SIM data from data communication network 10 into the terminal equipment A–D.

For implementation of the method according to the invention, data communication network 10 is connected with a functionality 15 for managing the SIM data and storing devices 13, 14 for storing the SIM data. The functionality 15 includes a routing module of a similar kind, which manages the downloading of SIM data into terminal equipment A–D and a functionality, for example, for synchronisation of subscriber data. The management functionality 15 is connected with the data communication network's 10 network service layer, through which the service can be managed.

In this context, management can be understood very broadly. It includes, for example, besides the routing, also authentication of the terminal equipment A–D making downloading requests, supervision of downloading and management of the functions relating to the transfer of SIM data from one piece of terminal equipment to another.

The management functionality 15 may be arranged in data communication network 10 in several ways. According to one embodiment, the server running it may be located in connection with the switching centre 12 of the data communication network 10, where are also located, for example, the HLR (Home Location Register) and the VLR (Visitor Location Register) of the terminal equipment A–D having the right to communicate in the network 10.

Besides these registers, a special SLR (SIMless Location Register) is arranged in the switching centre for SIMless terminal equipment. The downloading service application 15 operates in register SLR. Register SLR includes storing devices for SIM data 14 of the subscribers and the network and for SIM applications 13. The SIM data of subscribers may be understood as including, for example, telephone memo data and SMS messages stored by these. Network-specific SIM data includes, for example, data characteristic of the concerned type of data communication network and network operator, which is obvious to the man skilled in the art. It should be noted that the SLR location register for SIMless terminal equipment may in reality be integrated either, for example, in connection with the HLR home location register or in connection with the VLR visitor location register.

According to one embodiment, the functionality of the method according to the invention may be based on signalling used in the communication carried on in data communication network 10, which signalling includes as one facility, for example, location update of the terminal equipment A–D. When the subscriber is registered in SLR register, he is hereby offered an additional flow so that he can have the SIM downloading service 15. Also in order to move over to the SLR location register for SIMless terminal equipment the subscriber must have the functions bringing about the register in his terminal equipment A–D.

Figure 2:
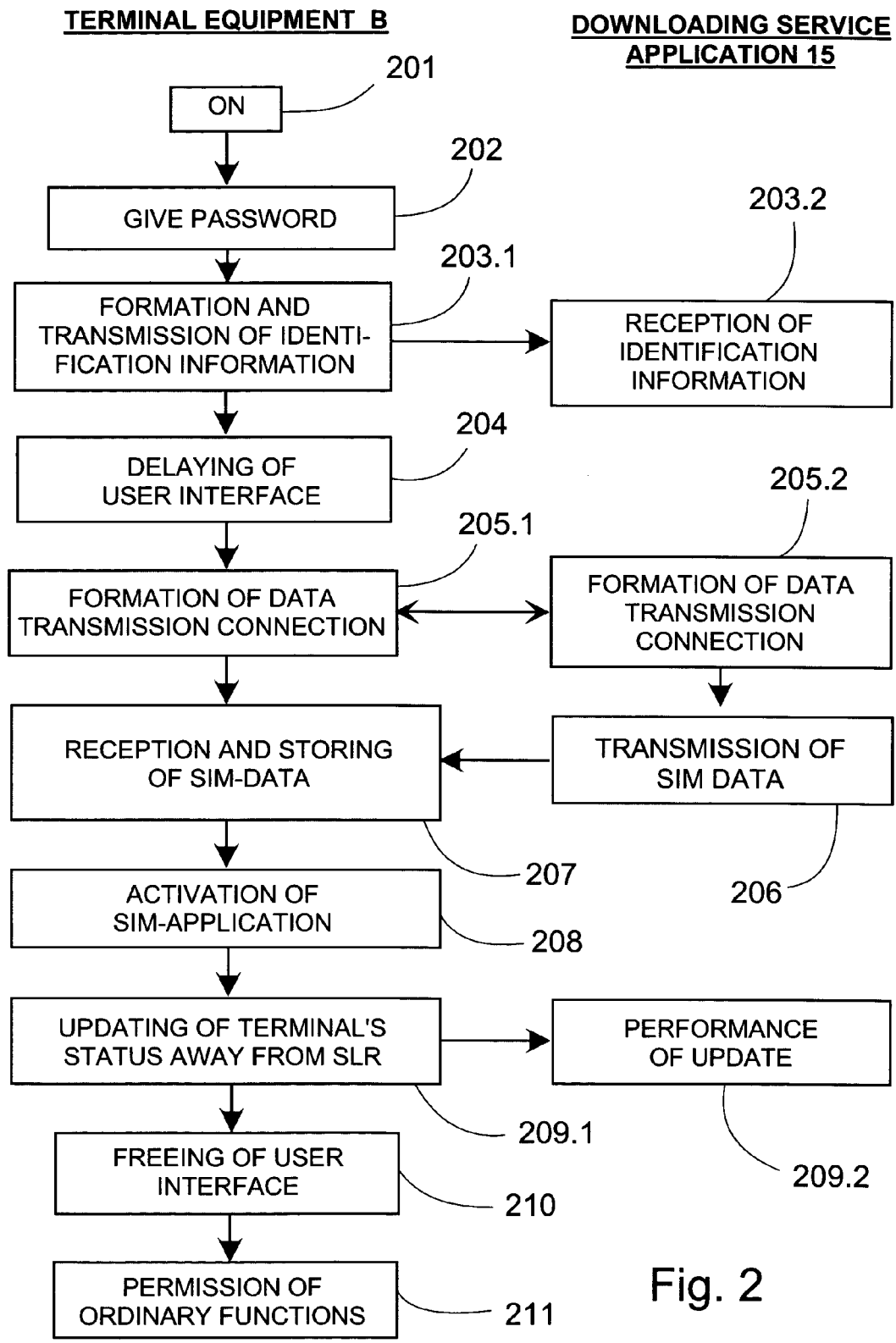
FIG. 2 is a flow diagram showing an example of the method according to the invention as a SIMless piece of terminal equipment connects with a data communication network for the first time.

FIG. 2 shows a possible application example of a situation, where SIMless terminal equipment B connects with data communication network 10 for the first time, for example, when the user has purchased a new subscriber connection. When the user has connected the power to his terminal equipment B, a starting functionality arranged therein will detect that there is no SIM facility in the terminal equipment B (201). The SIM downloading application 16.3 is then activated in terminal equipment B, and it is then being run, for example, in a protected JAVA environment SJE.

Downloading application 16.3 asks the user for a possible user identifier, password or other such unambiguously identifying identifier of the subscriber connection or part used in its formation (202). The user gives identifier, for example, from the terminal equipment's B keyboard, and based on the identifier the terminal equipment will form the user's identifier information using, for example, equipment information, besides the identifier given by the user (203.1).

Identifier information is transmitted through data communication network 10 to the management functionality 15, which receives it and finds that the subscriber in question has the right to download the SIM facility in his terminal equipment B (203.2). If the subscriber does not have the right to download the SIM facility in the network 10, the terminal equipment B is blocked and its SIM downloading application 16.3 makes a similar attempt in the following network 10 found.

At the same time, the user interface is delayed at terminal equipment B, by showing, for example, a "SIM loading" message or some other such notification (204). Between terminal equipment B and management functionality 15 a data communication connection is formed (205.1, 205.2) and data transmission is carried out to download SIM data 13.3, 14.3 in terminal equipment B (206, 207).

The terminal equipment receives the SIM data 13.3, 14.3 and stores it in its memory devices (207). When all 13.3, 14.3 or possibly at least an essential part of it has been downloaded at terminal equipment B, the SIM application is activated in the terminal equipment's B virtual protected JAVA environment SJE (208). When the terminal equipment's B SIM downloading application 16.3 has made sure that all the SIM data 13.3, 14.3 to be downloaded has been successfully downloaded and stored in terminal equipment B, terminal equipment B is updated away from the SIMless location register SLR (209.1). Management functionality 15 performs the updating in its database SLR (209.2).

Next, the terminal equipment's B user interface is freed and the user is permitted to perform the ordinary steps known as such to the man skilled in the art, which are, for example, user and terminal equipment authentication steps in the data communication network 10 (211).

Network 10 must allow time for performance of the procedure and it must not reject, even if the IMSI or the SRES (Signed RESponse) needed for authentication would be late.

Figure 3:
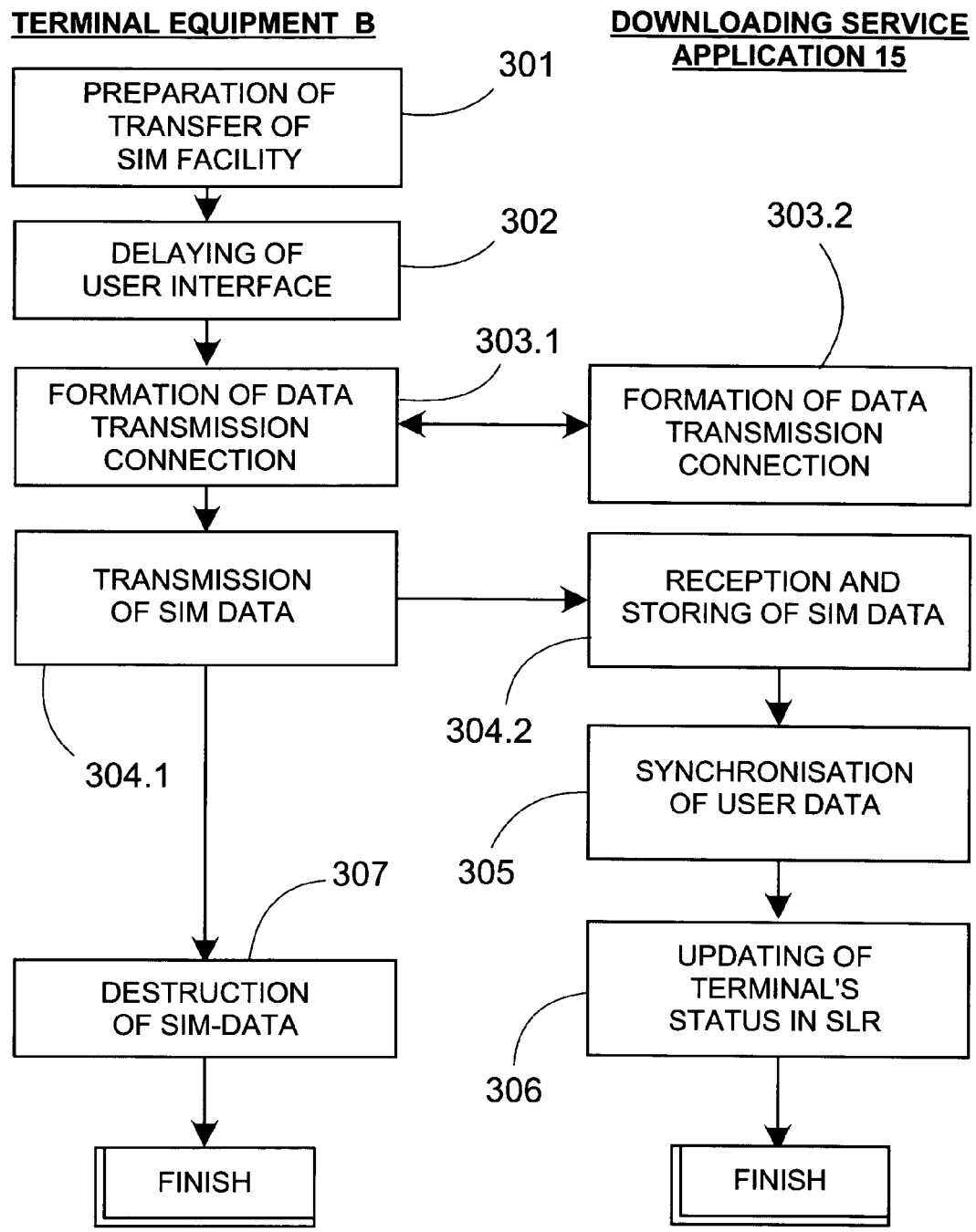
FIG. 3 is a flow diagram showing an example of the method according to the invention when the SIM facility is transferred from a first piece of terminal equipment to a second piece of terminal equipment.

FIG. 3 is a flow diagram showing an example of the method according to the invention when transferring the SIM facility from a first piece of terminal equipment to a second piece of terminal equipment. The user may face such a situation, for example, if he buys new terminal equipment and wishes to use the old subscriber connection also in his new terminal equipment A.

With terminal equipment B turned on the user first performs steps to transfer the SIM facility (301). Such steps include, for example, updating of subscriber-specific data, such as, for example, "cleaning out" unnecessary data from the SMS message file and the telephone memo data. This step will reduce, among other things, the number of data to be transferred.

From terminal equipment's B application menu the SIM downloading application 16.3 is activated and the SIM data transfer facility is chosen from the menu. At the same time it is possible to set the password or other such identifier for re-downloading of SIM data in other terminal equipment A (not shown). From terminal equipment B the user interface is again delayed by showing, for example, a "SIM loading" message on its display (302). Between the first terminal equipment B and management functionality 15 a data transmission session is set up in order to transfer SIM data 13.3, 14.3 through the data communication network 10 (303.1, 303.2).

The SIM data 13.3, 14.3 is transmitted from terminal equipment B and it is received by the management functionality 15 and stored in storing devices 13, 14 arranged in connection therewith (304.1, 304.2). The transferred freshest subscriber data is synchronised with possible older subscriber data (305) and after the successful performance of the data transfer the terminal equipment's B status is updated in the SIMless location register SLR (306).

When terminal equipment's B SIM downloading application 16.3 has also received confirmation of the successful transfer of SIM data 13.3, 14.3 in databases 13, 14 subordinated to the management functionality 15, terminal equipment B is used to destroy the SIM data 13.3, 14.3, so that it will not be available to unauthorised parties, such as, for example, a possible new owner of the first terminal equipment B (307).

Next, the user may take steps to download the SIM facility in another piece of terminal equipment A, for example, applying the procedure shown in FIG. 2.

In the method according to the invention, the SIM application and subscriber data 13, 14 may be encrypted. One way of implementing encryption is to use solutions based on a secret and public encryption key, wherein several authentication and signing methods may also be adapted. The decryption operations or SIM algorithms to be carried out on data 13, 14 may also be carry out encrypted. This may be carried out in embedded devices at hardware level or in some isolated software entity (JAVA KVM). To carry out the SIM facility known API (Application Protocol Interface) software interfaces are used, for which, according to one embodiment, the MExE (Mobile Station Application Execution Environment) protocol drafted by 3GPP/ETSI workteams may be utilised. Herein, when identifying the subscriber downloading the SIM facility, the APIs used by the SIM application are opened up for use. In a PC environment, isolation may be performed according to the same principle.

The processing of the data flow between the protected storing, the air interface and the protected processing environment may also be encrypted with encryption methods of sufficient power.

The following is a presentation of some possible, but in no way limiting alternatives for arranging data security and authentication of the subscriber, for example, when downloading SIM data into terminal equipment B and when transferring it from a first piece of terminal equipment B into a second piece of terminal equipment A.

In the first alternative embodiment, the terminal equipment's B IMEI (International Mobile Equipment Identification) is attached to the subscriber. Such an embodiment is possible, for example, when the terminal equipment B acquired by the user is sponsored by the network operator.

Once started, terminal equipment B will transmit to data communication network 10 a CM-SERVICE REQ message, wherein the terminal equipment's IMEI identification may be one parameter. The message requests a control manager service and it is a standard message in the GSM technology and is known as such. The management functionality 15 arranged in data communication network 10 starts the SIM data downloading procedure based on the IMEI identification. Management functionality 15 uses, for example, asymmetric encryption (RSA) and encrypts the SIM data to be transmitted with the terminal equipment's B public encryption key. The SIM data received by terminal equipment B is decrypted by its own secret key and it is stored in protected storing devices. Besides encryption, the same keys are used for performing signing of the SIM data.

According to one model of procedure, distribution of terminal equipment's B public key may be arranged in such a way that terminal equipment B includes a fixed secret key, whereby based on the IMEI identification network 10 looks for the public key provided by the manufacturer of terminal equipment B. The public key may be one distributed by the terminal equipment manufacturer or it may also be requested from it in the course of the identification procedure.

The user identifier given to the user in connection with the subscriber connection sale, which may be, for example, a disposable one, becomes a secret key, for example, together with the IMEI identification and other random items. Even generally in order to form sufficiently secure identifiers it is possible to use fixed equipment information arranged in the terminal equipment (numerical data included in circuit components, etc.). The public key is generated by a calculation of a corresponding kind arranged in connection with the management functionality 15.

Correspondingly, when it is desired to transfer the SIM facility from a first piece of terminal equipment to a second one, the IMEI of the new terminal equipment must give to the management functionality 15.

In a second alternative, a search of the IMEI identification is used for arranging data security and authentication of the subscriber, wherein the IMSI may be generated on the move. When terminal equipment B is started, it transmits to data communication network 10 a request for performance of location updating or a CM service request, wherein the IMSI is a parameter. Based on the IMSI identification, data communication network 10 activates the SIM facility downloading procedure.

The IMSI identification is formed in terminal equipment B, for example, in such a way that the user of terminal equipment B supplies it or so that it is generated in data communication network 10. Using the IMSI identification a public encryption key is formed for terminal equipment B or for network 10. Another way of forming an operator-specific IMSI identification, which means that there is no SIM facility in terminal equipment B. Hereby management functionality 15 inquires of terminal equipment B as regards those IMSI identifications, which are not in the SIMless location register SLR, whether the IMSI identification was provided from the outside. If the IMSI was given from outside, the terminal equipment's B downloading request is barred.

According to another embodiment, information is added in the terminal equipment to the identification supplied by the user, such as, for example, a signature, by which even the terminal equipment B may confirm the user's validity. Terminal equipment B may also provide network 10 with some IMSI identification dedicated to downloading of the SIM facility and the subscriber is identified separately from the identification given by the user, whereby, for example, its period of validity is being checked.

Downloading and encryption of the actual SIM data are performed in a similar way as in the first alternative, that is, management functionality 15 asks terminal equipment B for the IMEI identification or using the user's identifying codes.

According to one embodiment, the SIM application data 13.1–13.4 to be downloaded may include, for example, only SIM logic partitions. These include, for example, processing of messages transmitted by terminal equipment A–D to the SIM facility and maintenance of indexes. Some algorithms, such as, for example, encryption algorithms, may be implemented at hardware level in terminal equipment A–D for reasons of security, whereby they are behind the API (Application Protocol Interface) facility for the applications. Of course, it is also possible to download algorithms from the data communication network 10, but this will also increase the time needed for downloading of the SIM facility.

The SIM data 13.1–13.4, 14.1–14.4 may also be compressed in a chosen manner, in order to reduce the time needed for downloading.

There may be a functionality for dealing with possible error situations in the terminal equipment's A–D SIM downloading application 16.1–16.4 and in the SIM downloading application in the management functionality arranged in data communication network 10. Such error situations may occur, for example, when the terminal equipment A–D runs out of power during downloading or transfer of SIM data 13.1–13.4, 14.1–14.4. Network trouble is another example of causes of possible error situations.

It should be noted that the method according to the invention may be utilised also in the case of other smart and processor cards, either allowing their dynamic downloading or their utilisation when forming the user's identification when downloading the SIM facility. Some non-limiting examples of these are the USIM (User Services Identity Module) functionality, the PEI (Personal Electronic Identification) card, the WIM (Wireless Identity Module) card, which is applied, for example, in mobile trading to identify the customer, the VISA card and other corresponding paycard facilities as well as multimedia terminal equipment, such as, for example, subscriber modules of satellite and digital TV receivers. However, the register/database application service may hereby be located outside the data communication network 10. One way of arranging a protected data transfer session is by using, for example, a network gateway.

A subscriber-specific data roaming function is also possible, for example, when the user changes network operator. This makes possible, for example, a transfer of the SMS message file and the telephone memo in connection with a new SIM facility.

In the method according to the invention, downloading of the SIM data through data communication network 10 must be understood very broadly. Besides the fact that SIM data 13.1–13.4, 14.1–14.4 is downloaded directly from data communication network 10 into terminal equipment A–D, data may also be delivered to terminal equipment A–D using a local data communication network, for example, in such a way that it is downloaded at the operator's service outlet from a personal computer PC by a programming device of a known kind using datalink connections known as such (datasuite, serialport, BlueTooth, IrDA) without any direct effect of an actual data communication network 10 (not shown). As another way of local downloading it is possible to utilise a connection set up directly between two pieces of terminal equipment B, A (not shown).

Further, according to an embodiment, a so-called SIM installation module may be connected to terminal equipment A, C. This may be arranged, for example, in connection with the physical SIM interface or otherwise locally (for example, with a BT connection). With the SIM installation module the terminal equipment A, C has normal access to the data communication network 10, whereupon the procedure may be started either automatically or by the user of terminal equipment A, C for downloading at terminal equipment A, C of the data required for implementing the SIM facility.

In the following are some in no way limiting examples of cases utilising such a SIM installation module. At the operator's sale outlet a connection can be made to the network with the operator's SIM installation module intended for the special subscriber (such as in the case of terminal equipment sponsored by the operator), which is then used for downloading the subscriber's own SIM facility from the network into the terminal equipment. Hereby the network identifies the special subscriber entitled to downloading of the SIM facility. Furthermore, it is possible with some other SIM card to connect to the network for downloading of the SIM facility from the SIM downloading service into the terminal equipment. The SIM card can then be removed from the terminal equipment. The SIM installation card may also be used, for example, for transferring the SIM facility to the terminal equipment, whereby the SIM installation module and the terminal equipment are in data communication connection during the transfer. After the data transfer the SIM installation module can be removed from the terminal equipment.

Further advantages made possible by the method according to the invention are the watertight and solid structure of the terminal equipment with mechanics free of holes, and for big customers, such as corporations, it is essentially easier to acquire subscriber connections and to have them installed in the terminal equipment. The SIM card can no longer be stolen from the terminal equipment and the SIM cards of special subscriber connections cannot be misused (special tariffs). In addition, the SIM facility is easy to exchange and assemble.

Plenty of new services are brought about for the subscribers with the method according to the invention. A dynamic performance of subscriber connection sales and acquisition can be mentioned as a first such utility aspect. If, for example, the terminal equipment A–D is in the SIMless state, it can be set to ask for subscriber connection offers from several network operators. In such "auction" situations the terminal equipment must usually have some kind of identifier to identify the user, and this may be, for example, a WIM (Wireless Identity Module) card. In addition, it must hereby be possible for the terminal equipment A–D to offer subscriber connections, even in such a situation where the terminal equipment A–D already has an active such. The nature of the subscriber connection becomes dynamic, which also requires dynamic subscriber data between the operators.

Another advantage achieved by the subscriber is that several subscriber connections may be downloaded in the terminal equipment A–D with the method according to the invention. This is possible, if the protected processor environment SJE of the terminal equipment A–D supports more than one application. Hereby the synchronisation of subscriber data between different SIM facilities may be carried out in the data communication network 10 through the management functionality 15, or as another alternative directly in the terminal equipment A–D in the protected processor environment SJE between the SIM facilities. The switching from the first SIM facility to the second may also be automated.

A multiplication of subscribers is a third achieved advantage. At the top of the home location register HLR more functionality may be arranged to deal from the same subscriber connection with more simultaneous connections to the data communication network 10. Hereby the subscriber may have several pieces of terminal equipment, all with the same subscriber identifier. The access right to one terminal equipment of the user can be clarified between the SIM facility of the terminal equipment and the home location register HLR without having to download the SIM application every time in each terminal equipment of the user.

In the foregoing the method according to the invention has been explained in the light of an individual application example. It is obvious that the procedural steps to implement the method according to the invention may contain subordinated steps, besides the steps presented above, and in some cases they may be carried out in an order differing from the above (for example, depending on the network operator).

It should be understood that the above description and the related figures are only intended to illustrate the method, terminal equipment and server according to the present invention. Thus, the invention is not limited only to the embodiments presented above or to those defined in the claims, but many such different variations and modifications of the invention will be obvious to the man skilled in the art, which are possible within the scope of the inventive idea defined by the appended claims.

What is claimed is:

1. A method for instituting a SIM (Subscriber Identity Module) facility in digital wireless terminal equipment communicating in a data communication network, wherein the SIM facility is associated with a processor functionality and memory devices for storing SIM data comprising application-, subscriber- and network-specific data and wherein the terminal equipment is also associated with a processor functionality for carrying out of dynamic applications, the method comprising:
   downloading at least a main part of the application-, subscriber- and network-specific data of the SIM facility into the terminal equipment through the data communication network, where the application-specific data further comprises SIM logic and algorithms; and
   implementing the SIM facility in the terminal equipment using the application-, subscriber- and network-specific data downloaded through the data communication network.

2. The method of claim 1, where the terminal equipment and the data communication network are equipped with a downloading application for downloading of the SIM data.

3. The method of claim 1, where the data communication network is associated with a functionality for management of the SIM data and devices for storing the SIM data.

4. The method of claim 1 wherein when the method is used with SIMless terminal equipment, the method further comprises:
   at the SIMless terminal equipment, connecting to the data communication network,
   forming identification information at the SIMless terminal equipment for downloading of the SIM data,
   transmitting the identification information to a management functionality associated with the data communication network,
   setting up and carrying out a data transmission session between the SIMless terminal equipment and the management functionality for downloading of the SIM data into the SIMless terminal equipment, and
   freeing the user interface at the SIMless terminal equipment.

5. The method of claim 4, where the status of the SIM facility of the terminal equipment is updated as one subordinated step.

6. The method of claim 1, wherein when the SIM facility is instituted in a second piece of terminal equipment by transferring the SIM facility from a first piece of terminal equipment to the second piece of terminal equipment the following steps are carried out
   at the first piece of terminal equipment, taking measures for transferring the SIM data for implementing the SIM facility,
   at the first piece of terminal equipment, connecting to the data communication network,
   setting up and carrying out a data transmission session between the first piece of terminal equipment and a management functionality associated with the data communication network for transferring the SIM data to the management functionality,
   synchronizing the SIM data transferred to the management functionality,
   at the second piece of terminal equipment, connecting to the data communication network, and
   at the said second piece of terminal equipment downloading the SIM data from the management functionality, where the SIM data concerns a SIM facility having the same identification information.

7. The method of claim 6, where identification information is also formed in order to activate the new SIM facility.

8. The method of claim 7, where equipment-specific data arranged in connection with the first piece of terminal equipment is used to form the identification information.

9. The method of claim 6, where SIM data is destroyed at the first piece of terminal equipment as one subordinated step.

10. The method of claim 1, where the terminal equipment further comprises a physical SIM processor card having a dynamic processor environment for carrying out of downloaded applications.

11. The method of claim 1, where at least a part of the data to be downloaded and/or transferred is compressed.

12. The method of claim 1, where at least a part of the data to be downloaded and/or transferred is encrypted.

13. The method of claim 1, wherein the downloading of SIM data into the terminal equipment is carried out locally.

14. The method of claim 1, wherein the algorithms concern at least one of authentication and encryption.

15. Digital wireless terminal equipment comprising:
   a SIM (Subscriber Identity Module) facility having a processor functionality and memory devices for storing SIM data comprised of application-, subscriber- and network-specific data for use in implementing the SIM facility;
   a processor functionality for carrying out of dynamic applications; and a downloading application for downloading into the terminal equipment at least a main part of the application-, subscriber- and network-specific data implementing the SIM facility, where the application-specific data comprises at least SIM logic and alorithms.

16. A server for use in establishing a SIM facility in digital wireless terminal equipment, wherein the server is connected to a data communication network and wherein the SIM facility comprises SIM data comprising at least application-, subscriber- and network-specific data, the server comprising a management functionality for management of the SIM data belonging to the SIM facility and devices for storing the SIM data and wherein the management functionality is associated with a routing application for downloading the SIM data into the terminal equipment through the data communication network and where the application-specific data further comprises SIM logic and algorithms.

* * * * *